Dec. 8, 1959  C. P. O'DAY ET AL  2,915,819
PIPE CUTTER
Filed March 19, 1958  3 Sheets-Sheet 1

Charles P. O'Day
Henry Leidenheimer, Jr.
Harold P. Guilbeau
INVENTORS

Dec. 8, 1959 C. P. O'DAY ET AL 2,915,819
PIPE CUTTER
Filed March 19, 1958 3 Sheets-Sheet 2

Charles P. O'Day
Henry Leidenheimer, Jr.
Harold P. Guilbeau
INVENTORS

BY *Clarence A. O'Brien*
*and Harvey B. Jackson*
Attorneys

Dec. 8, 1959   C. P. O'DAY ET AL   2,915,819
PIPE CUTTER

Filed March 19, 1958   3 Sheets-Sheet 3

Charles P. O'Day
Henry Leidenheimer, Jr.
Harold P. Guilbeau
INVENTORS

United States Patent Office 2,915,819
Patented Dec. 8, 1959

2,915,819

PIPE CUTTER

Charles P. O'Day, Henry Leidenheimer, Jr., and Harold P. Guilbeau, New Orleans, La., assignors to I.D. Pipe Cutter Company, Inc., Harvey, La., a corporation of Louisiana Application March 19, 1958, Serial No. 722,417

11 Claims. (Cl. 30—103)

This invention relates in general to new and useful improvements in mechanical type cutters, and more specifically to an improved pipe cutter.

The cutting of small diameter pipe normal to the axis thereof is easily accomplished by means of a pipe cutter which rolls about the exterior of the pipe and which employs a cutter blade which is progressively fed into the pipe. Thus the cutting of small diameter pipes is relatively simple. On the other hand, the cutting of large diameter pipes becomes a problem inasmuch as the type of pipe cutter which may be used in conjunction with small diameter pipes may not be employed in conjunction with large diameter pipes because of their size. Therefore, large diameter pipes are normally cut by means of an acetylene torch which does not provide the accurate cut desired. Further, there are many instances where large diameter pipes are so positioned whereby the exteriors of the pipes are not available.

It is therefore the primary object of this invention to provide a pipe cutter, the pipe cutter being of such a construction whereby it cuts the pipe from the interior outwardly thus eliminating the necessity of having access to the exterior of the pipe in the area being cut.

Another object of this invention is to provide an improved pipe cutter for large diameter pipes, the pipe cutter employing the true surface of the interior of the pipe for the purpose of aligning the pipe cutter whereby the pipe cutter automatically will cut the pipe along a line disposed in a plane normal to the axis of the pipe.

Another object of this invention is to provide an improved pipe cutter which includes an elaongated support shaft, the support shaft having mounted thereon means for engaging the interior of the pipe whereby the support shaft is positioned coaxially of the pipe, and there being carried by the support shaft for rotation a cutter head, the cutter head being driven and having a tool which engages the interior wall of the pipe so that the pipe is cut from the interior out.

A further object of this invention is to provide a pipe cutter for large diameter pipes, the pipe cutter being of such a construction whereby it may be positioned within the pipe and is aligned relative to the pipe by engagement with the pipe, the pipe cutter being fluid driven whereby it may be remotely controlled.

A further object of this invention is to provide an improved pipe cutter for cutting large diameter pipes from the interior thereof, the pipe cutter including a support shaft, a plurality of support bars carried by the support shaft in circumferentially spaced relation, the support bars extending longitudinally of the support shaft and being supported relative thereto by extensible support arms whereby the support shaft is automatically positioned coaxially of the pipe to be cut, and there being rotatably journalled on the support shaft and driven by a power unit carried by the support shaft a cutter head, the cutter head including at least one cutter blade or cutting tool which is carried by an extensible support member to facilitate the pressure engagement of the cutter blade or cutting tool with the interior wall of the pipe to be cut.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
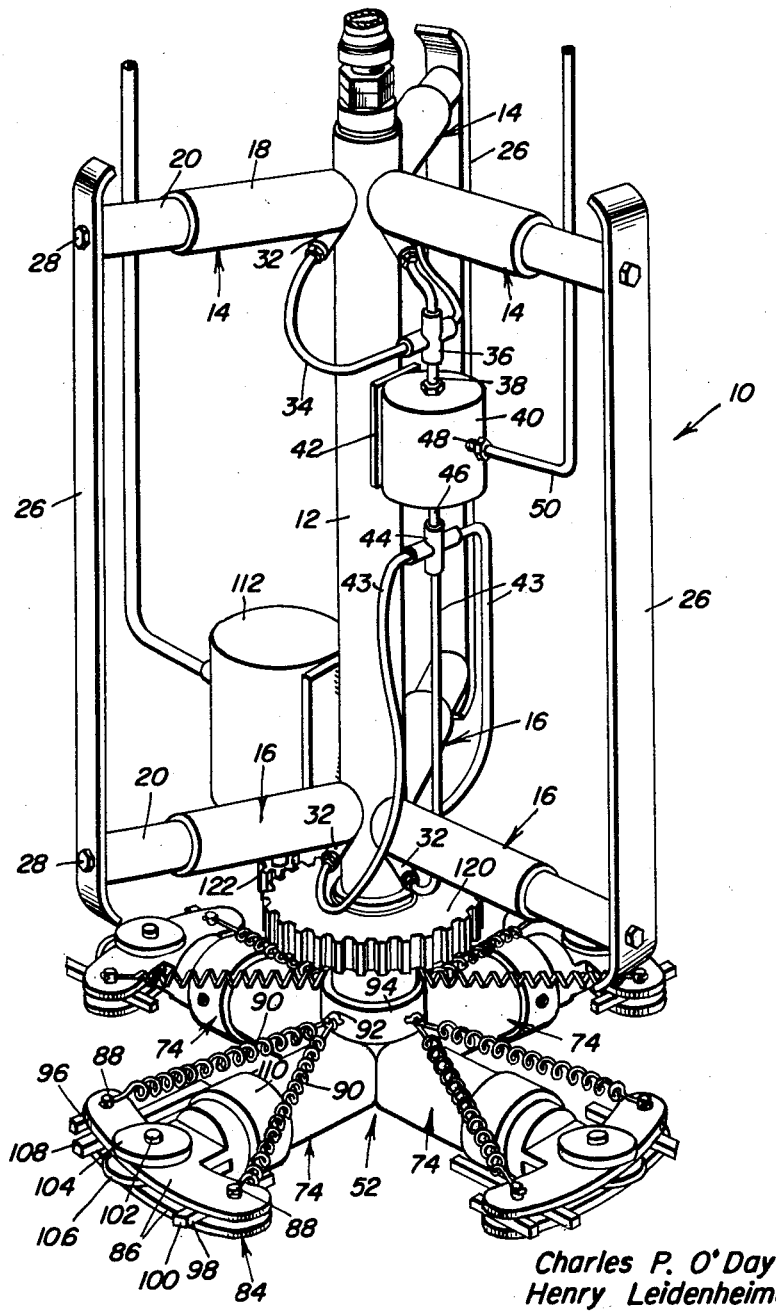
Figure 1 is a perspective view of the pipe cutter which is the subject of this invention and shows the general details of the construction thereof.

Referring now to the drawings in detail, it will be seen that there is illustrated the pipe cutter which is the subject of this invention, the pipe cutter being referred to in general by the reference numeral 10. The pipe cutter 10 includes a tubular support shaft 12 which is the main supporting member thereof. The tubular support shaft 12 has secured thereto in radially extending, circumferentially spaced relation a first set of support arms each of which is referred to in general by the reference numeral 14. The support arms 14 are disposed normal to the axis of the support shaft 12 and positioned adjacent one end thereof. Also carried by the support shaft 12 in spaced relation to the support arms 14, but spaced from the opposite end of the support shaft 12 is a second set of support arms each of which is referred to in general by the reference numeral 16. The support arms 16 are positioned corresponding to respected ones of the support arms 14 and are circumferentially spaced. The support arms 16 are disposed in a plane normal to the axis of the support shaft and extend radially therefrom.

Figure 4:
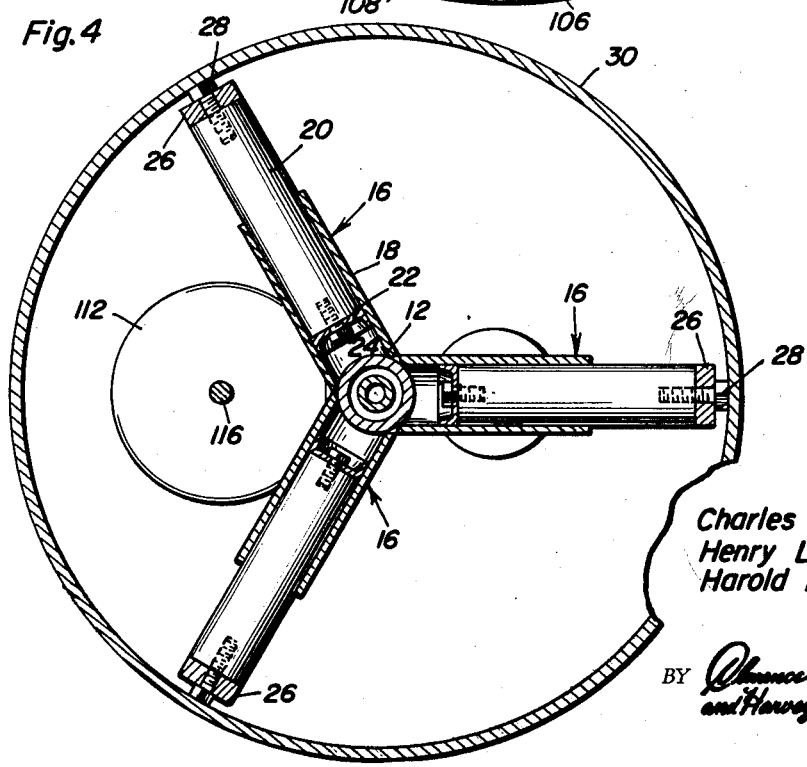
Figure 4 is a transverse sectional view taken substantially upon the plane indicated by the section line 4—4 of Figure 2 and shows the details of the support arms for the support bars.

Referring now to Figure 4 in particular, it will be seen that there is illustrated the details of the support arms 16. Each of the support arms 16 is in the form of an extensible fluid motor and includes a cylinder 18 which is welded to the support shaft 12. Carried by each cylinder 18 is an elongated piston 20 which extends out of the cylinder 18 and which is provided on the inner end thereof with a sealing cup 22, the sealing cup 22 being secured to the piston 20 by means of a bolt 24. Inasmuch as the support arms 14 are identical with the support arms 16, the support arms 14 are not specifically described as to their details.

As was stated above, each support arm 14 has disposed relative thereto in a corresponding position a support arm 14. Extending between each pair of support arms 14 and 16 is a support bar 26. Each support bar 26 is secured to the piston 20 of its respective support arms 14 and 16 by means of bolts 28. The support bars must be a minimum of three in number and are disposed in longitudinally extending, circumferentially spaced, parallel relation relative to the support shaft 12.

The purpose of the support bars 26 is to be positioned within a pipe to be cut, such as the pipe 30 and then the support arms 14 and 16 are to be extended so that the support bars 26 are moved into pressure engagement with the interior walls of the pipe 30 and thus position the support shaft 12 coaxially of the pipe 30. In order to accomplish this, each of the cylinders 18 is provided with a fluid fitting 32 which has connected thereto a flexible fluid line 34. The flexible fluid lines 34 for the support arms 14 are connected to a manifold 36 which is in turn connected by a fluid line 38 to the upper end of a pressure fluid reservoir 40. The fluid reservoir 40 is secured to the support shaft 12 by means of a mounting plate 42. Connected to the fluid fittings 32 of the support arms 16 are fluid supply lines 43. The fluid supply lines 43 are identical with the fluid supply lines 34 except as to their length. The fluid supply lines 43 are connected to a manifold 44 which is in turn connected to the lower end of the pressure fluid reservoir 40 by means of a fluid supply line 46.

In order that fluid under pressure may be supplied to the pressure fluid reservoir 40, there is provided a fitting 48 to which there is connected a main fluid supply line 50. The opposite end of the main fluid supply line 50 is not illustrated. However, it is to be understood that it will be of a sufficient length to extend exteriorly of the pipe 30 to be cut and there will be provided a suitable control valve for controlling the flow of fluid therethrough. Also, there will be connected to the fluid supply line 50 a main fluid pressure source (not shown).

Figure 2:
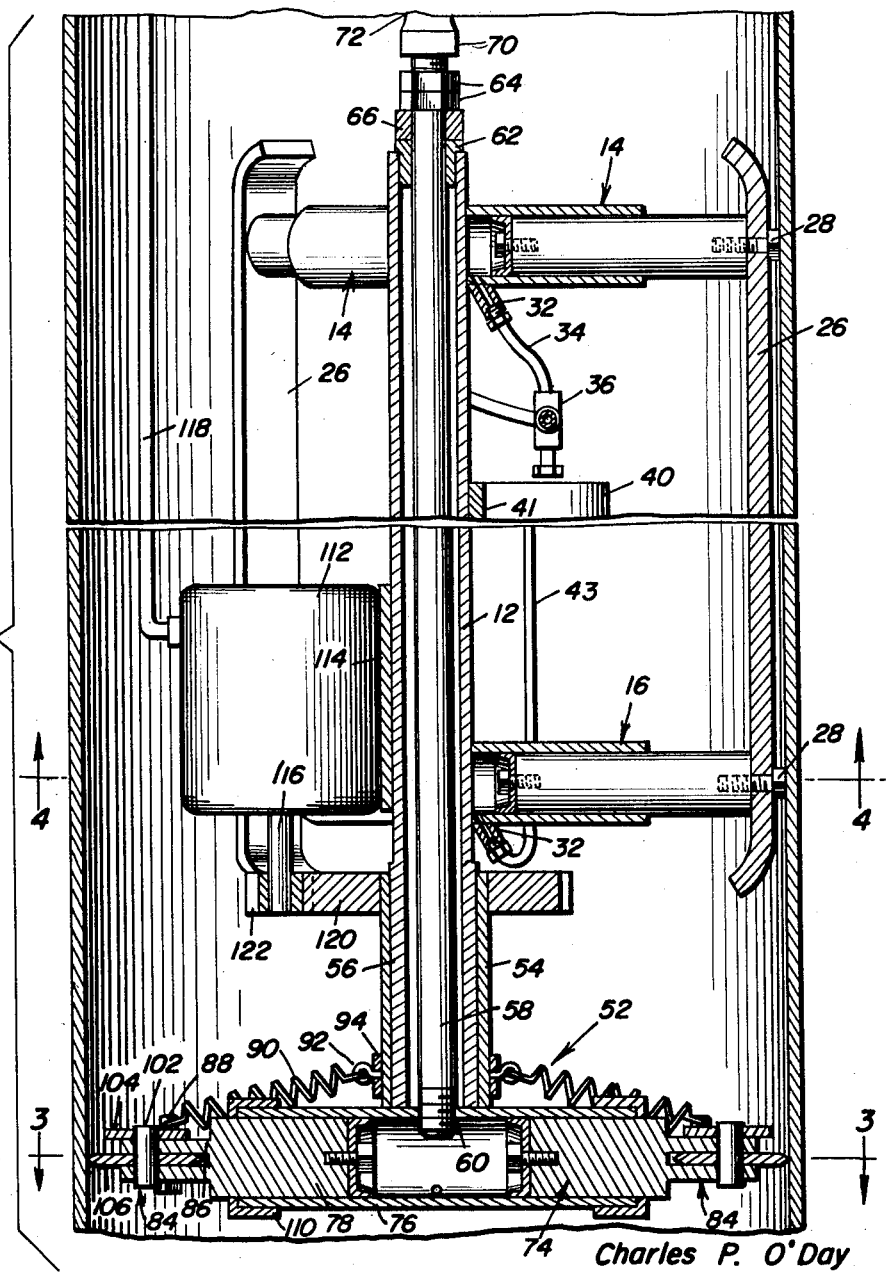
Figure 2 is a longitudinal sectional view taken through a pipe with the pipe cutter positioned therein for cutting the pipe, the pipe cutter also being in section in order to illustrate the details of construction of the cutter head thereof.

In order to facilitate the cutting of the pipe 30, there is carried by the support shaft 12 at the end thereof remote from the support arms 14 a cutter head which is referred to in general by the reference numeral 52. The cutter head 52, as is best shown in Figures 1 and 2, includes a sleeve 54 which is suitably journalled on an enlarged end portion 56 of the support shaft 12. The sleeve 54 is retained on the support shaft 12 by means of a tubular shaft 58 which has a threaded connection as at 60 with the cutter head 52. The shaft 58 extends through the support shaft 12 and is rotatably journalled in a bearing block 62 positioned in the opposite end of the support shaft 12. Disposed between the bearing block 62 and nuts 64 threadedly engaged on the end of the shaft 58 remote from the cutter head 52 is a thrust bearing 66. Connected to the end of the shaft 58 is a fitting 70 for a pressurized fluid line 72. The fitting 70 may be a conventional fitting or may be a swivel fitting, as is desired. It is to be understood that the shaft 58 will rotate and thus provisions must be made for this.

Carried by the sleeve 54 is a plurality of cutter head units each of which is referred to in general by the reference numeral 74. Each cutter head unit 74 is identical and therefore the components of the individual cutter head units 74 will not be described in detail, only one of the cutter head units being described. However, it is to be noted that the cutter head units 74 are secured together and to the sleeve 54 in a cruciform arrangement.

Figure 3:
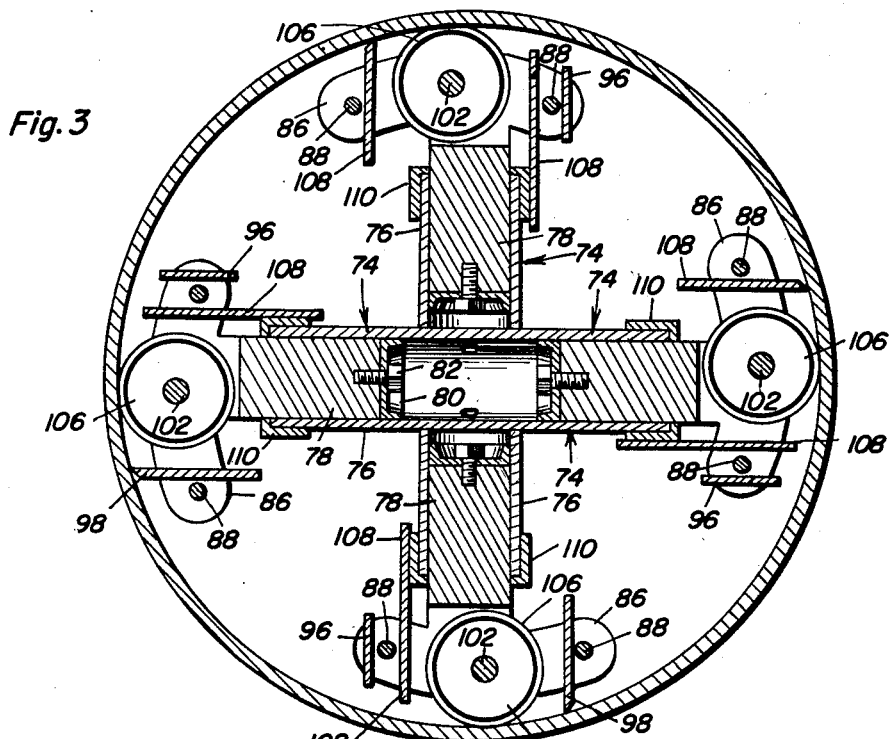
Figure 3 is a transverse sectional view taken substantially upon the plane indicated by the section line 3—3 of Figure 2 and shows further the details of the construction of the cutter head.

The individual cutter head unit 74, as is best shown in Figure 3, includes a cylinder 76. Positioned within each cylinder 76 and extending outwardly thereof is a piston 78. The piston 78 is provided at the inner end thereof with a sealing cup 80 which is secured in place by means of a fastener 82.

Carried by the outer end of each of the pistons 78 is a cutting tool support which is referred to in general by the reference numeral 84. Each cutting tool support 84 includes a pair of generally T-shaped plates 86 which are spaced apart and which have the stem portions thereof connected to the piston 78. The plates 86 are connected together adjacent opposite ends of the crossbar portion thereof by means of pins 88. The pins 88 have connected to one end thereof a tension spring 90 whose opposite end is connected to an eye 92. The individual eyes 92 are carried by a collar 94 which is secured to the sleeve 54, as is best illustrated in Figure 2.

The plates 86 are retained in spaced relation at one outer end thereof by means of a spacing bar 96. A second spacing bar 98 is disposed between the other outer ends of the plates 86. The spacing bar 98 is in the form of a scraper and includes a scraping head 100.

Disposed at the intersection between the stem portion and the cross portion of each of the plates 86 is a pin 102 with an enlarged head 104. Rotatably journalled on the pin 102 intermediate the plates 86 is a cutter wheel 106.

In order to prevent rotation between the piston 78 and the cylinder 76, there is carried by the cylinder 76 a guide bar 108. The guide bar 108 extends between the plates 86 and is secured in place on the cylinder 76 by means of a collar 110.

At this time it is pointed out that while a cutter wheel, such as the cutter wheel 106 has been illustrated, any type of cutting tool may be used. However, when the cutter wheel 106 is used, the scraper 98 will also be used. The scraper 98 will be set inwardly of the cutter wheel 106 so as to follow the cutting action of the cutter wheel 106.

In order that the cutter head 52 may be rotated, there is provided a power unit 112 which is illustrated as being a fluid motor of the rotary type although it may be of other types of construction, including an electric motor. The fluid motor 112 is mounted on the support shaft 12 by means of a support plate 114. The fluid motor 112 includes a drive shaft 116. Fluid is supplied to the fluid motor 112 by means of a fluid line 118 which will be connected to a suitable pressurized fluid source and will be controlled by a suitable control valve (not shown).

Carried by the end of the sleeve 54 remote from the cutter head unit 74 is a gear 120 which is disposed coaxial of the sleeve 54. Meshed with the gear 120 is a gear 122 carried by the drive shaft 116. Thus the power unit 112 serves to rotationally drive the sleeve 54.

In the operation of the pipe cutter 10, the pipe cutter 10 is lowered or pushed into the pipe to be cut while suspended from the fluid line 72. When the cutter head 52 is in the proper position with respect to the pipe 30, fluid under pressure is applied to the fluid pressure reservoir 40 through the fluid supply line 50 at which time the support arms 14 and 16 are extended to urge the support bars 26 into pressure engagement with the inner wall of the pipe 30. This positions the support shaft 12 both longitudinally of the pipe 30 and coaxial therewith.

Fluid pressure is then applied to the interiors of the cylinders 76 so as to urge the cutter wheels 106 into pressure engagement with the inner wall of the pipe 30. The pressure to be exerted will be predetermined and will be controlled exteriorly of the pipe 30. Then fluid under pressure is supplied to the power unit 112 which rotates the cutter head 52. As the cutter head 52 rotates, the cutter wheels 102 will progressively cut into the inner wall of the pipe 30 to provide a continuous cutting operation. The scrapers 98 will complete the cut and provide a straight cutting edge. This process is continued until such time as the pipe 30 is cut in half, after which the power unit 112 will be deenergized, and the pressure is released from the cylinders 76. The springs 90 will then move the cutter wheels 106 out of engagement with the pipe 30 and so position the cutter head 52 for withdrawal from one section of the pipe 30. Pressure is then relieved from the fluid pressure reservoir 40 at which time the pipe cutter 10 is ready for withdrawal from the pipe section.

From the foregoing description of the pipe cutter 10, it will be readily apparent that the pipe cutter 10 is relatively simple in construction and at the same time is of such a construction whereby it will be effective in operation. Further, because of the simplicity of construction of the pipe cutter 10, it may be readily controlled. Also, it will be seen that the operation of the pipe cutter 10 will be efficient inasmuch as the support shaft and the cutter head 52 are initially positioned coaxially of the pipe to be cut thereby providing for an efficient cutting operation. Inasmuch as the pipe cutter 10 employs the pipe to be cut as the support therefor, it will be seen that the positioning of the pipe cutter 10 is a relatively simple matter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An internal pipe cutter comprising an elongated support shaft, a plurality of elongated support bars extending longitudinally of said support shaft and spaced circumferentially about said support shaft, support arms fixedly secured to said support shaft and mounting said support bars relative to said support shaft, said support arms being extensible in length whereby said support bars may be urged into pressure contact with an interior wall of a pipe to be cut to position said support shaft, a cutter head rotatably journaled on said support shaft, and a power unit mounted on said support shaft and drivingly connected to said cutter head for rotating said cutter head.

2. An internal pipe cutter comprising an elongated support shaft, means for anchoring said support shaft in a pipe to be cut coaxial thereof, a cutter head rotatably journaled on said support shaft, and a power unit fixedly mounted on said support shaft and drivingly connected to said cutter head for rotating said cutter head.

3. An internal pipe cutter comprising an elongated support shaft, a plurality of elongated support bars extending longitudinally of said support shaft and spaced circumferentially about said support shaft, support arms mounting said support bars relative to said support shaft, said support arms being extensible in length whereby said support bars may be urged into pressure contact with an interior wall of a pipe to be cut to position said support shaft, said support arms being in the form of extensible fluid motors, a cutter head rotatably journaled on said support shaft, and a power unit mounted on said support shaft and drivingly connected to said cutter head for rotating said cutter head.

4. An internal pipe cutter comprising an elongated support shaft, a plurality of elongated support bars extending longitudinally of said support shaft and spaced circumferentially about said support shaft, support arms mounting said support bars relative to said support shaft, said support arms being extensible in length whereby said support bars may be urged into pressure contact with an interior wall of a pipe to be cut to position said support shaft, said support arms being in the form of extensible fluid motors, fluid lines connecting said fluid motors to a single pressurized fluid source whereby said support shaft is centered coaxially of the pipe to be cut, a cutter head rotatably journaled on said support shaft, and a power unit mounted on said support shaft and drivingly connected to said cutter head for rotating said cutter head.

5. An internal pipe cutter comprising an elongated support shaft, a plurality of elongated support bars extending longitudinally of said support shaft and spaced circumferentially about said support shaft, support arms mounting said support bars relative to said support shaft, said support arms being extensible in length whereby said support bars may be urged into pressure contact with an interior wall of a pipe to be cut to position said support shaft, a cutter head rotatably journaled on said support shaft, and a power unit mounted on said support shaft and drivingly connected to said cutter head for rotating said cutter head, said cuter head including a sleeve rotatably journaled on said support shaft, a support member extending radially from said sleeve, and a cutting tool carried by said support member remote from said sleeve, said cutting tool facing outwardly for engaging an inner wall of the pipe to be cut.

6. An internal pipe cutter comprising an elongated support shaft, means for anchoring said support shaft in a pipe to be cut coaxial thereof, a cutter head rotatably journaled on said support shaft, and a power unit mounted on said support shaft and drivingly connected to said cutter head for rotating said cutter head, said cutter head including a sleeve rotatably journaled on said support shaft, a support member extending radially from said sleeve, and a cutting tool carried by said support member remote from said sleeve, said cutting tool facing outwardly for engaging an inner wall of the pipe to be cut.

7. An internal pipe cutter comprising an elongated support shaft, means for anchoring said support shaft in a pipe to be cut coaxial thereof, a cutter head rotatably journaled on said support shaft, and a power unit mounted on said support shaft and drivingly connected to said cutter head for rotating said cutter head, said cutter head including a sleeve rotatably journaled on said support shaft, a plurality of support members extending radially from said sleeve, and a cutting tool carried by each of said support members remote from said sleeve, each of said cutting tools facing outwardly for engaging an inner wall of the pipe to be cut.

8. An internal pipe cutter comprising an elongated support shaft, means for anchoring said support shaft in a pipe to be cut coaxial thereof, a cutter head rotatably journaled on said support shaft, and a power unit mounted on said support shaft and drivingly connected to said cutter head for rotating said cutter head, said cutter head including a sleeve rotatably journaled on said support shaft, a support member extending radially from said sleeve, and a cutting tool carried by said support member remote from said sleeve, said cutting tool facing outwardly for engaging an inner wall of the pipe to be cut, said support member being in the form of an extensible fluid motor.

9. An internal pipe cutter comprising an elongated support shaft, means for anchoring said support shaft in a pipe to be cut coaxial thereof, a cutter head rotatably journaled on said support shaft, and a power unit mounted on said support shaft and drivingly connected to said cutter head for rotating said cutter head, said cutter head including a sleeve rotatably journaled on said support shaft, a plurality of support members extending radially from said sleeve, and a cutting tool carried by each of said support members remote from said sleeve, each of said cutting tools facing outwardly for engaging an inner wall of the pipe to be cut, said support members each being in the form of an extensible fluid motor.

10. An internal pipe cutter comprising an elongated support shaft, a plurality of elongated support bars extending longitudinally of said support shaft and spaced circumferentially about said support shaft, support arms mounting said support bars relative to said support shaft, said support arms being extensible in length whereby said support bars may be urged into pressure contact with an interior wall of a pipe to be cut to position said support shaft, said support arms being in the form of extensible fluid motors, a cutter head rotatably journaled on said support shaft, and a power unit mounted on said support shaft and drivingly connected to said cutter head for rotating said cutter head, said cutter head including a sleeve rotatably journaled on said support shaft, a support member extending radially from said sleeve, and a cutting tool carried by said support member remote from said sleeve, said cutting tool facing outwardly for engaging an inner wall of the pipe to be cut.

11. An internal pipe cutter comprising an elongated support shaft, a plurality of elongated support bars extending longitudinally of said support shaft and spaced circumferentially about said support shaft, support arms mounting said support bars relative to said support shaft, said support arms being extensible in length whereby said support bars may be urged into pressure contact with an interior wall of a pipe to be cut to position said support shaft, said support arms being in the form of extensible fluid motors, a cutter head rotatably journaled on said support shaft, and a power unit mounted on said support shaft and drivingly connected to said cutter head for rotating said cutter head, said cutter head including a sleeve rotatably journaled on said support shaft, a plurality of support members extending radially from said sleeve, and a cutting tool carried by each of said support members remote from said sleeve, said cutting tool facing outwardly for engaging an inner wall of the pipe to be cut, said support members each being in the form of an extensible fluid motor.

References Cited in the file of this patent
UNITED STATES PATENTS

| | | |
|---|---|---|
| 769,310 | Faessler | Sept. 6, 1904 |
| 910,547 | Kohler | Jan. 26, 1909 |